Jan. 6, 1925.
A. J. GOSSELIN
1,522,115
DRIVING CHUCK FOR LATHES
Filed May 4, 1920
2 Sheets—Sheet 1
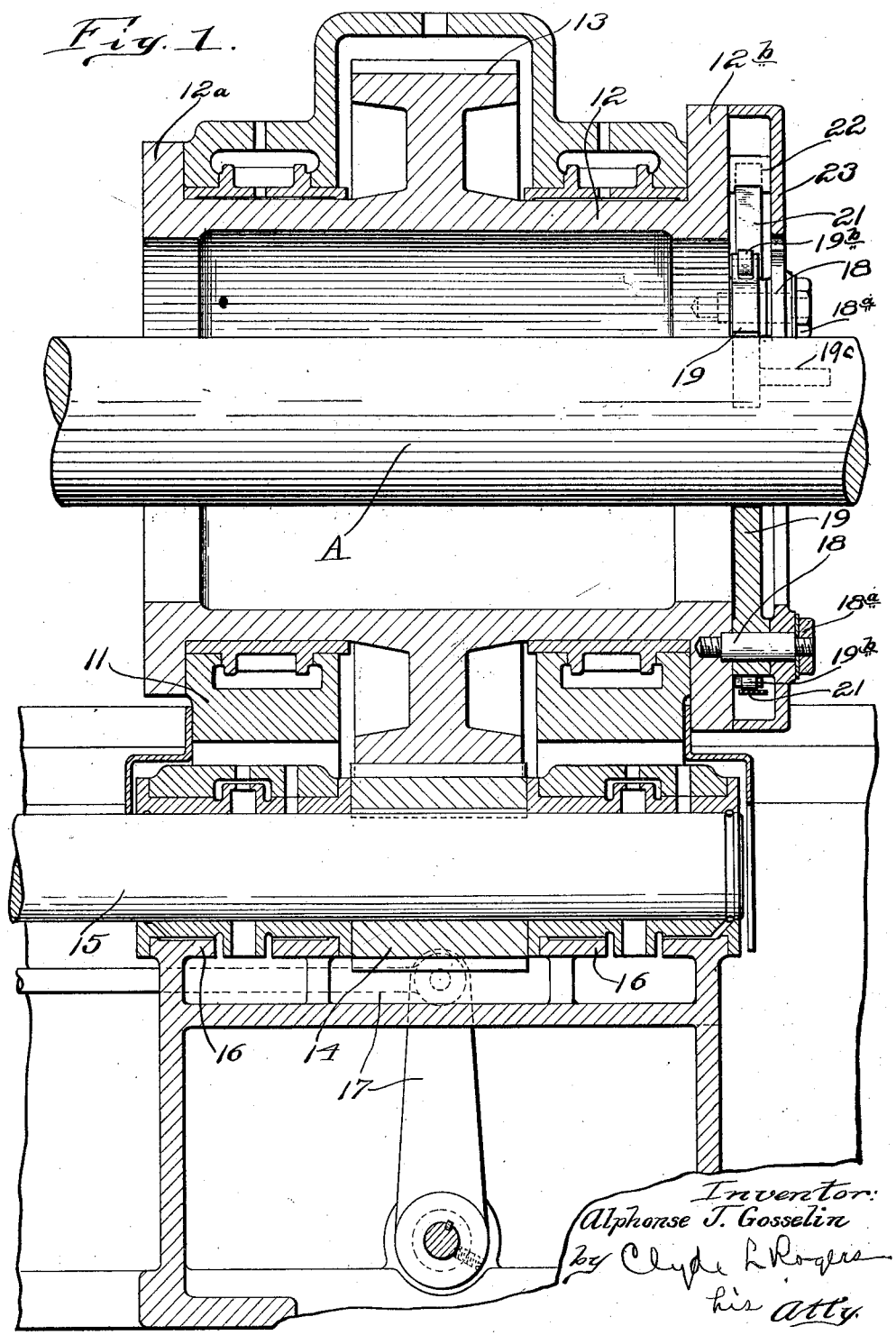
Inventor:
Alphonse J. Gosselin
by Clyde L Rogers
his Atty.

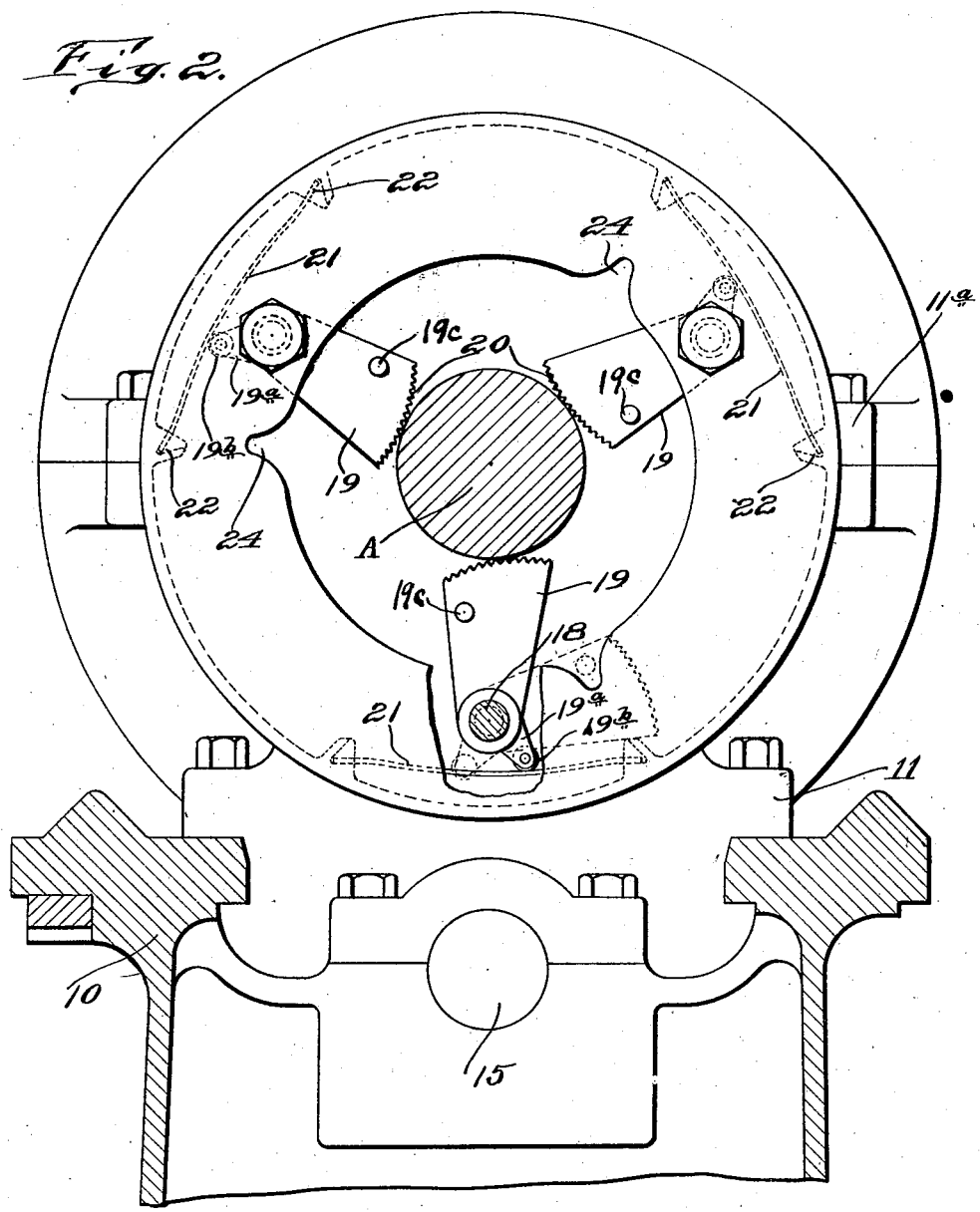

Patented Jan. 6, 1925.

1,522,115

UNITED STATES PATENT OFFICE.

ALPHONSE J. GOSSELIN, OF ROCHESTER, NEW YORK, ASSIGNOR TO ARTHUR H. INGLE, OF ROCHESTER, NEW YORK, A CORPORATION.

DRIVING CHUCK FOR LATHES.

Application filed May 4, 1920. Serial No. 378,863.

*To all whom it may concern:*

Be it known that I, ALPHONSE J. GOSSELIN, a citizen of the United States, and resident of Rochester, county of Monroe, State of New York, have invented an Improvement in Driving Chucks for Lathes, of which the following description, in connection with the accompanying drawings, is a specification, like characters on the drawings representing like parts in each of the several views.

This invention relates to driving chucks or work engaging means for axle lathes or like machine tools involving the use of a hollow spindle through which the work piece is passed and which requires to be equipped with means for engaging the periphery of the work to rotate the same. A principal object of the invention is to provide the driving element of the lathe, which may be a hollow spindle, with a plurality of spaced apart work engaging dogs arranged to firmly grip and hold the axle or shaft or like work piece between them and thus constitute an effective steady rest as well as a driving means, whether the work piece be precisely central of the lathe axis or not. To this end the driving dogs are mounted and arranged to engage the work with a strong and reliable driving grip that is evenly distributed and apportioned automatically to the several points of driving engagement. A further object is to provide an improved mounting and arrangement of work driving dogs whereby these are capable of easy and convenient manipulation to engage the same with the work and to be held normally in disengaged position and out of the way until required for use. The foregoing and other objects and advantages of the invention will more fully appear from the following detailed description, and the distinctive features of novelty will be thereafter pointed out in the appended claims.

Referring to the drawings:

Fig. 1 is a partial longitudinal vertical section of an axle lathe equipped with my invention, a portion of an axle being shown in elevation as fitted therein; and Fig. 2 is a partial transverse section through the lathe bed, the hollow spindle work driving dogs of the invention being shown in end elevation.

10 indicates a lathe bed upon which is mounted a housing 11 formed to constitute a mounting and sleeve bearing for a hollow spindle sleeve 12. For this purpose the housing 11 has an upper sleeve portion $11^a$ removably clamped to the lower sleeve portion as usual to permit assemblage of the spindle sleeve 12 therewith. The spindle sleeve 12 has formed at its ends radial ring flanges $12^a$, $12^b$ respectively which fit against the ends of the sleeve bearing 11 and hold the spindle sleeve from endwise movement. The spindle sleeve is equipped with a usual driving gear 13 shown as integral therewith and engaged by a pinion 14 fixed on a shaft 15 mounted in suitable bearings 16 of the machine base, this shaft being suitably connected with the prime drive (not shown) of the machine. 17 indicates a lever and link connection to the clutch control of the machine, which forming no part of the present invention need not be further mentioned herein.

The radial ring flange $12^b$ at the front end of the spindle sleeve 12 is relatively wide and substantial and has fitted therein a series of pivot studs or pins 18, shown as three in number and equally spaced angularly thereof. These studs have fitted thereto driving dogs 19, the operative faces whereof are eccentric with reference to their pivots and preferably serrated as indicated at 20 so that these dogs are adapted to swing inward and engage an axle or work piece A with a capability of self adaptation with reference thereto, and being thus adapted to drive the axle uniformly and evenly even though it may not be exactly central of the spindle. The dogs 19 are equipped with angularly extending tail pieces $19^a$ which may be provided with rolls $19^b$ at their extremities and these are engaged by stout leaf springs 21 which are held at their ends in sockets 22 provided therefor in lugs borne by a cap 23. The cap 23 is fitted to the face of the flange $12^b$ and may be conveniently held thereto by the pivoted studs 18, the outer ends of which are passed through holes of this cap with clamping nuts $18^a$ applied to their extremities. The angular disposition of the offset tail pieces $19^a$ of the dogs is such that as the dogs are swung towards work engaging position these tail pieces will occupy a position forward of the radial line through the dog pivots and hence the action of the springs 21 will tend to swing the dogs inward against the work, while as indicated by dotted line in Fig. 2 when the dogs are swung out of operative position, the tail pieces will occupy a position back of the radial line through the dog pivots thus tending to hold the dogs yieldingly in inoperative position. The dogs are equipped with outwardly projecting pins 19ᶜ to constitute hand pieces for engaging the same to move them as required for engaging or disengaging the work. The central portion of the cap 23 is cut away to permit entrance of the work and is shown as further recessed as indicated at 24 to afford clearance for the pins 19ᶜ. With the described construction the serrated faces of the driving dogs 19 will firmly engage and serve as steady rests for the work piece as well as acting as driving instrumentalities, and quite as effectively whether the axle or like work piece A be exactly central or somewhat off center of the lathe axis at the point of driving engagement. The several dogs 19 occupy somewhat different angular positions with respect to the work piece in case the axle is off center and the relatively wide serrated faces 20 having sufficient angular extent to take care of a considerable variation in such angular position of the several dogs. I am aware that the invention may be embodied in other specific forms without departing from the spirit or essential attributes thereof, and I therefore desire the present embodiment to be considered in all respects as illustrative and not restrictive reference being had to the appended claims rather than to the foregoing description to indicate the scope of the invention.

Having described my invention, what I desire to claim as new and desire to secure by Letters Patent is:

1. A combined steady rest and work driver for axle lathes and the like comprising a hollow spindle through which the work piece is passed and a set of work engaging members adjustably carried thereby constructed and arranged for automatic self-adjustment through a substantial range with respect to a work piece whereby they are adapted to steady and grip the same for driving whether the work piece be central of the spindle or not, said work-engaging members each mounted for free and independent movement apart from the others permitting such automatic self-adjustment.

2. A combined steady rest and driving chuck for axle lathes and the like comprising a hollow spindle through which the work piece is passed having pivoted thereto three work engaging dogs having serrated work engaging faces of substantial range eccentric of their pivots and adapted to serve as both steadying and driving means for the work piece held therebetween irrespective of its alignment with the axis of the lathe, each of said work-engaging dogs mounted for movement free and independent of the others for the purpose stated.

3. Work driving means for axle lathes and the like comprising a hollow spindle sleeve through which the work piece is passed equipped with a radial flange at one end thereof and a plurality of driving dogs fitted to said flange at equally spaced apart points and having work engaging faces of substantial range eccentric of their pivots, each of said driving dogs mounted for movement free and independent of the others for the purpose stated.

4. Work driving means for axle lathes and the like comprising a hollow spindle sleeve through which the work piece is passed equipped with a radial ring flange at one end thereof, a plurality of dogs pivoted to said flange and extending radially inward of the spindle with eccentric serrated work engaging faces of substantial range, and means engaging said dogs to hold them yieldingly in inoperative position when moved to such position.

5. A combined steady rest and work driving means for axle lathes and the like comprising a hollow spindle sleeve through which the work piece is passed having a plurality of work driving dogs pivoted at one end thereof and equally spaced apart, said dogs having eccentric work engaging faces of substantial range and each equipped with means for moving it into and out of operative position.

6. Work driving means for axle lathes and the like comprising a hollow spindle sleeve having a radial ring flange at one end thereof, a plurality of equally spaced dogs pivoted to such flange, each driving dog equipped with a tail piece extending angularly therefrom, spring means engaging said tail pieces and tending to move the dogs against the work and also to hold them yieldingly in inoperative position when moved to such position.

7. Work driving means for axle lathes and the like comprising a hollow spindle sleeve having a radial ring flanged at one end thereof, a plurality of pivot studs fixed to said flange equally spaced apart, driving dogs pivoted to said studs each equipped with an angularly extending tail piece, and a cap fitted to said studs and held thereby against said ring flange, said cap bearing springs engaging said tail pieces of the dogs and adapted to press the dogs into engagement with the work and also to hold them in inoperative position when moved to such position.

In testimony whereof, I have signed my name to this specification.

ALPHONSE J. GOSSELIN.